C. H. ATKINS.
PROCESS OF PRESERVING MILK.
APPLICATION FILED MAR. 3, 1911.
1,057,519.
Patented Apr. 1, 1913.
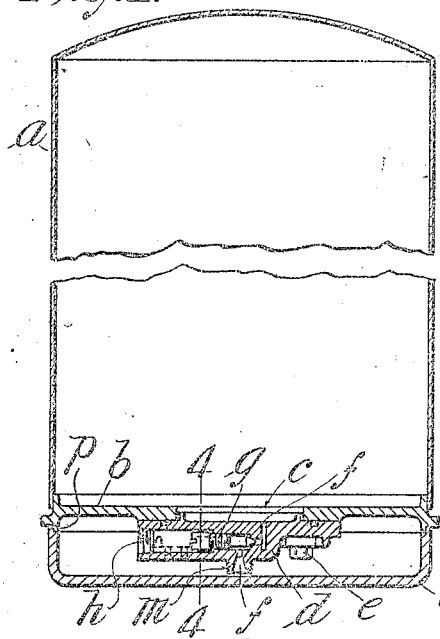
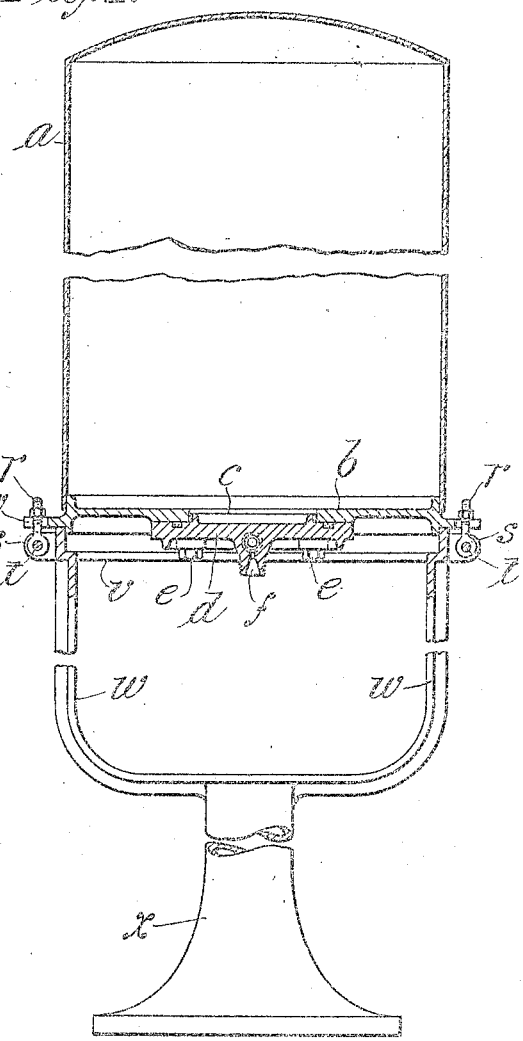
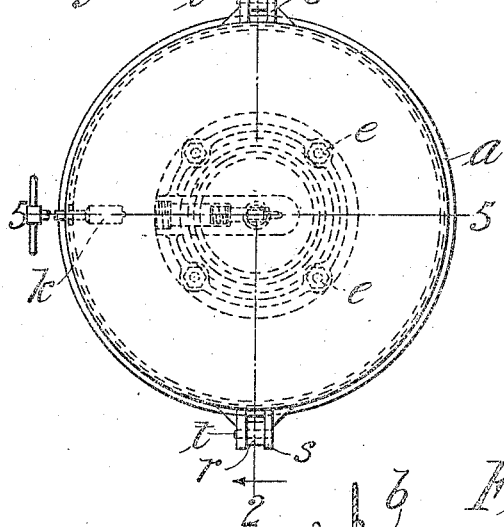
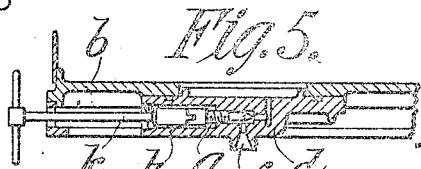
WITNESSES:
K. O. Clemons
E. H. Elder
INVENTOR,
Charles H Atkins
BY Chapin & Co
ATTORNEY.

UNITED STATES PATENT OFFICE.

CHARLES H. ATKINS, OF SPRINGFIELD, MASSACHUSETTS.

PROCESS OF PRESERVING MILK.

1,057,519.

Specification of Letters Patent.  Patented Apr. 1, 1913.

Application filed March 3, 1911.  Serial No. 612,147.

*To all whom it may concern:*

Be it known that I, CHARLES H. ATKINS, a citizen of the United States of America, residing at Springfield, in the county of Hampden and State of Massachusetts, have invented new and useful Improvements in Processes of Preserving Milk, of which the following is a specification.

This invention relates to the preservation of milk, broadly, and specifically to the process for the preservation of milk on a commercial scale, as compared with the purely experimental or laboratory basis.

The prior art discloses, in a number of patents, the fact that milk, when subjected to a certain degree of heat, can be made sterile and in such condition, provided air is excluded from the container, it may be kept in a palatable condition for a long time.

So far as applicant is aware, there is no disclosure in the prior art whereby the public has in any degree been benefited by this knowledge up to the present time. Heretofore, for example, as disclosed in Letters Patent of the United States issued to Walker on May 18, 1899 numbered 625,280, milk has been charged in a close vessel, pressure has then been applied to that vessel, and then it has been subjected to a sufficient degree of heat to properly sterilize the contents,—the vessel being provided with a tube and faucet of the ordinary so-called "siphon bottle" whereby the contents may be drawn off, as required. This method, while it involves the basic idea of sterilization as employed in the process forming the subject of the present application, is only capable of being practised on a relatively small scale, and the distribution of the product can extend only over a relatively small area; and, furthermore, in carrying out this process, it is necessary to employ mechanism for forcing the milk into a closed container against constantly increasing pressure, due to the air contained therein before the beginning of the charging operation. This not only involves considerable expense, which is vital from a commercial point of view, but it also involves passing the milk through a pump or similar device employed in charging the container, and under these conditions of operation cleanliness, as understood at the present time, would be practically impossible, though theoretically it might be possible by frequently dismantling the charging apparatus and thoroughly cleaning and sterilizing the same. Other patents might be cited in which the same fundamental idea of sterilization is disclosed, but so far as applicant is aware, as stated above, they contain no disclosure whereby the daily product of a dairy may be handled and packaged on a commercial scale, without fear of contamination, and so treated as to make it possible to preserve the contents in palatable condition for many months.

The object of the present invention is, therefore, to provide a process whereby milk may be so treated on a commercial scale as to make it possible to keep it in a palatable condition for months without the use of ice or refrigeration, which will permit its transportation and distribution in bulk, as practised at the present time, with the advantage, however, that the element of time in effecting this distribution is a negligible factor permitting the selection of the cheapest mode of transportation.

In the drawings forming part of this application,—Figure 1 is a sectional elevation of a container of the preferred form, the cap for closing it being secured thereon and the cover inclosing the removable cap being secured in its place. Fig. 2 is a view similar to Fig. 1 showing the cover removed and the container mounted on a standard. Fig. 3 is a plan view of the underside of the container shown in Fig. 1. Fig. 4 is a cross sectional view on line 4—4, Fig. 1, showing the construction of the needle valve on a somewhat enlarged scale. Fig. 5 is a sectional view of the cap showing means applied thereto for opening the needle-valve.

The container $a$, as shown in Figs. 1 and 2, is preferably made in the form of a cylinder of steel with a head $b$ welded into the open end thereof, there being an opening $c$ in said head into which is fitted a closing cap $d$ which may be secured to the head in any suitable manner, as by means of the bolts $e$, whereby the container may be hermetically sealed. A passage $f$ is made through the cap $d$ and is so disposed that the screw-threaded needle-valve g may be operated to open or close said passage at will. This valve is located in a hole h drilled into the cap, preferably in such manner that the needle-valve g is inaccessible except by means of a specially devised tool k, as shown in Figs. 3 and 5, said concealed valve being provided to prevent surreptitious abstraction of the contents of the container. The outer end of the passage f is through a projection m which is screw-threaded to receive a pipe whereby the required volume of air under pressure may be introduced into the container after the cap d has been secured in place. All of the parts of the container should be tinned to provide against corrosion.

To protect the cap d from injury during shipment, a cover o of metal is fitted closely over the rim p of the head b, the latter being provided with the ears q through which bolts r extend which are carried on lugs s on the cover, whereby the latter may be tightly secured to the head by turning up the nuts on the bolts, the latter being preferably hung on pins t between the lugs s, as shown, similar bolts being used to secure the container to the supporting standard, as shown in Fig. 2.

When the container is set up for use, it is mounted upon a circular frame v, as shown in Fig. 2, which frame, by means of the U-shaped arms w extending from a suitable base x, supports the container at a convenient distance from the floor, the whole being so arranged that the valve-operating tool k may be conveniently used to open and close the valve g to draw the contents of the container off.

In carrying out this process, the cap d is removed from the container and through the relatively large opening c in the head b, the milk may be poured into the container from pails, or otherwise, until, in a container of the capacity specified,—viz., 50 quarts,—an amount equal to about 44 quarts of milk has been introduced. The cap is then put into place, and a pipe connection screwed onto the projecting end on the cap, and air, under pressure of 100 lbs., more or less, is then admitted into the vacant space remaining in the container. The desired pressure having been attained, the valve g is closed, the container then being subjected, in a suitable apparatus provided therefor, to the action of about 225 degrees of heat, Fahrenheit, for a sufficient length of time to thoroughly sterilize the contents, say for about one hour and a half. The container is then removed from the sterilizing chamber, and the cover o secured in place over the head, and from this time on no further attention is required. The container, with its contents, may now be left indefinitely in any temperature; it may be handled with impunity and the contents drawn therefrom, as required, the container being set up, as described, whereby a constant pressure of the contents will be maintained against the head thereof. With the amount of space in the container devoted to the air chamber at the pressure indicated, the entire contents of the container may be drawn off without exhausting the pressure, which will permit the complete evacuation of the container without permitting the entrance of any outside air. Therefore, when the receptacle is returned for refilling, decomposition will not take place therein of the particles of milk which might adhere to the walls, and consequently the consumer is not only protected but the cost of re-sterilization, before refilling the container, is avoided.

Preferably, before the milk is placed in the container, it is passed through a separator to remove any foreign substances which will inevitably find a lodgment therein in spite of the utmost care used in collecting it; and the products of the separator, that is the cream and milk, are then poured into the container and thereby again become mixed together: or, the separator may be so located as to deliver its contents directly into the containers. Another fact which greatly simplifies the use of this process is that when the milk has been treated as herein set forth, the cream contained therein will not rise to the surface, no matter how long a container may be left in one position. This fact makes it possible, therefore, to deliver relatively large containers which may be set up in a convenient place and the milk drawn therefrom, as required, and the natural distribution of the fatty substances throughout the fluid body of the milk remaining unchanged, the user is always assured of a supply of milk in practically normal condition.

The process is equally adapted to the preservation and distribution of cream on a large scale, thus making it possible to supply users of large quantities very economically with a product which, as collected and distributed at present, is frequently a menace to the public health.

By means of the herein described process, milk, in times of plentiful supply, can be put up and stored anywhere.

What I claim, is:—

The process for preserving and handling milk which consists in freely pouring into a container open to the atmosphere a quantity of milk of less volume than the capacity of the container, then closing the container and introducing therein air under sufficient pressure to provide and maintain an excess air-pressure within the container, then subjecting the sealed container and contents to a sufficiently high temperature for a sufficient length of time to prevent the subsequent development of living organisms therein, and finally removing the liquid contents of the container while in an inverted position whereby the excess air-pressure will insure the complete expulsion of the entire liquid contents and still leave the container wholly filled with sterile air to maintain the inside walls of the container sterilized for refilling purposes.

CHARLES H. ATKINS.

Witnesses:
 HARRY W. BOWEN,
 WM. H. CHAPIN.